United States Patent
Li

(10) Patent No.: US 9,538,372 B2
(45) Date of Patent: Jan. 3, 2017

(54) ESTABLISHING COMMUNICATION BETWEEN DEVICES

(71) Applicant: Alibaba Group Holding Limited, Grand Cayman (KY)

(72) Inventor: Zhiguo Li, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 9 days.

(21) Appl. No.: 14/631,746

(22) Filed: Feb. 25, 2015

(65) Prior Publication Data

US 2015/0249918 A1 Sep. 3, 2015

(30) Foreign Application Priority Data

Feb. 28, 2014 (CN) .......................... 2014 1 0073613

(51) Int. Cl.
| | | |
|---|---|---|
| *H04L 29/06* | (2006.01) | |
| *H04W 12/04* | (2009.01) | |
| *H04W 4/00* | (2009.01) | |
| *H04W 76/02* | (2009.01) | |
| *H04W 12/02* | (2009.01) | |

(52) U.S. Cl.
CPC ............. *H04W 12/04* (2013.01); *H04W 4/008* (2013.01); *H04L 63/0442* (2013.01); *H04W 12/02* (2013.01); *H04W 76/023* (2013.01)

(58) Field of Classification Search
CPC .................................................. H04L 63/0442
USPC ........................................................ 713/169
See application file for complete search history.

(56) References Cited

U.S. PATENT DOCUMENTS

| | | | | |
|---|---|---|---|---|
| 5,657,390 A | * | 8/1997 | Elgamal ................. | H04L 29/06 713/151 |
| 7,818,578 B2 | * | 10/2010 | Lewis ................... | H04L 9/3271 713/168 |
| 9,094,454 B2 | * | 7/2015 | Jallow ................... | H04W 4/008 |
| 2004/0117623 A1 | | 6/2004 | Kalogridis et al. | |
| 2007/0150420 A1 | | 6/2007 | Iwamoto et al. | |

(Continued)

FOREIGN PATENT DOCUMENTS

| | | |
|---|---|---|
| CN | 102118710 | 7/2011 |
| WO | WO2013109370 | 10/2013 |

OTHER PUBLICATIONS

PCT Search Report and Written Opinion mailed Jun. 10, 2015 for PCT Application No. PCT/US15/17588, 8 Pages.

*Primary Examiner* — Longbit Chai

(74) *Attorney, Agent, or Firm* — Lee & Hayes, PLLC

(57) ABSTRACT

When a first device receives an indication to establish a communication with a second device, a feature character string is generated. The first device is associated with a first public key and a first private key. The second device is associated with a second public key and a second private key. The second public key of the second device is obtained. The second public key is used to encrypt the feature character string. A first identification of the first device is at least partly based on the encrypted feature character string and is published. When the feature character string is obtained after decryption, the first public key of the first device is obtained. The second identification is an identification encrypted by the first public key. In response to a determination that the feature character string is obtained after decryption of the second identification, the communication between the first device and the second device is established.

20 Claims, 5 Drawing Sheets

(56) References Cited

U.S. PATENT DOCUMENTS

| | | |
|---|---|---|
| 2008/0065892 A1 | 3/2008 | Bailey et al. |
| 2008/0240433 A1 | 10/2008 | Fahn et al. |
| 2009/0287929 A1 | 11/2009 | Kolesnikov et al. |
| 2011/0081860 A1 | 4/2011 | Brown et al. |
| 2011/0093710 A1 | 4/2011 | Galvin et al. |
| 2011/0258434 A1* | 10/2011 | Qiu ................. H04L 9/006 713/153 |
| 2011/0268274 A1 | 11/2011 | Qiu et al. |
| 2012/0069394 A1* | 3/2012 | Ono ................. G06F 3/121 358/1.15 |
| 2012/0303591 A1 | 11/2012 | Chen et al. |
| 2012/0311273 A1 | 12/2012 | Marathe et al. |
| 2013/0046984 A1 | 2/2013 | Lucidarme et al. |
| 2013/0159706 A1 | 6/2013 | Li et al. |
| 2014/0047195 A1 | 2/2014 | Frey et al. |
| 2014/0075121 A1 | 3/2014 | Blundell et al. |
| 2014/0149741 A1 | 5/2014 | Balakrishnan et al. |
| 2015/0074366 A1 | 3/2015 | Calciu et al. |
| 2015/0089153 A1 | 3/2015 | Busaba et al. |

\* cited by examiner

ESTABLISHING COMMUNICATION BETWEEN DEVICES

CROSS REFERENCE TO RELATED PATENT APPLICATIONS

This application claims foreign priority to Chinese Patent Application No. 201410073613.8 filed on 28 Feb. 2014, entitled "Method, Apparatus, and System for Establishing Communication between Devices," which is hereby incorporated by reference in its entirety.

TECHNICAL FIELD

The present disclosure relates to the field of communication and, more specifically, to a method, an apparatus, and a system for establishing communication between devices.

BACKGROUND

Near field communication, also referred to as near field wireless communication, is a short distance high frequency wireless communication technology that allows point-to-point data transfer and data transmission between electronic devices without visible connection. This technology is derived from radio frequency identification (RFID) technology and is based on RFID and its related technology. Near field communication is short distance high frequency wireless technology and runs at 13.56 MHz within 20 cm, which has three transmission speeds including 106 KB/s, 212 KB/s, or 424 KB/s.

Near field communication business combines near field communication technology and mobile communication technology to implement electronic payment, identity recognition, ticket business, data exchange, anti-counterfeiting, advertising, etc., which is a kind of new business in wireless communication field. Near field communication business changes the manner in which users use mobile phones so that consumer behaviors of the user are becoming electronic and a new user consuming and business model is established.

There are mainly two existing techniques corresponding to near field communication devices.

A first technology is near field induction with a common RF card matching function that is associated with an apparatus for receiving signals and an RF card. For example, a mobile phone that is equipped with the RF card directly scans for payment at a bus or conducts payment at a point of sale (POS). The RF card is unique to each mobile phone and its unique identification is to identify the mobile phone. The apparatus that receives signals actively reads or passively receives the unique ID of the RF card. The RF card is mainly used in a mobile payment application such as an electronic wallet.

A second technology is near field induction with server assistance. A common application is a shaking function of an instant communication tool. When two persons concurrently shake their mobile phones with the instant communication tool, each phone obtains a shaking signal and sends such signal to a server. The server matches phones that are shaken concurrently and have adjacent locations. Such technology has been widely used in gaming, file transfers, payments, etc.

However, the first technology requires installing a special RF card at an electronic device while the RF card is not common at the electronic device especially a smart phone. The main reason is that a special device needs to be installed at the electronic device. However, on one hand there is high cost and on the other hand such special device has no universal standard. An RF card installed on the electronic device by one manufacturer may be incompatible with another manufacturer. Thus, corresponding recognition devices also need to be widely used. Therefore, universality and applicability of the first technology are very weak.

The second technology requires near field devices within a short distance. Especially with respect to payment, the distance is restricted to reduce a mapping error to implement accurate mapping. In addition, a mapping accuracy of devices is not high. One of the reasons is that the number of clients that shake concurrently is not certain. There might be multiple devices that shake concurrently. Thus, the shaking has no direction. The server determines how to match. It is difficult to conduct one-to-one mapping. Therefore, the second technology has low security and is difficult for automatic mapping.

Thus, a technical problem that is urgent for one of ordinary in the art to resolve is to provide a mapping mechanism of a near field device, which has low cost, high accuracy, and high security.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to apparatus(s), system(s), method(s) and/or computer-readable instructions as permitted by the context above and throughout the present disclosure.

A technical problem resolved by the present techniques is to provide an example method for establishing a communication between devices, which has low cost, high accuracy, and high security.

Correspondingly, the present disclosure also provides an example apparatus for establishing a communication between devices and a system for establishing a communication between devices to ensure implementation and application of the above example method.

To resolve the technical problem, the present disclosure provides an example method for establishing a communication between devices.

When a first device receives an indication to establish a communication with a second device, a feature character string is generated. The first device has or is associated with a first public key and a first private key. The second device has or is associated with a second public key and a second private key.

The second public key of the second device is obtained. The second public key is used to encrypt the feature character string. A first identification of the first device is at least partly based on the encrypted feature character string and is published.

When a second identification of the second device is searched or found, the first private key is used to decrypt the second identification. The second device searches the first identification and uses the second private key to decrypt the first identification. When the feature character string is obtained after decryption, the first public key of the first device is obtained. The second identification is an identification encrypted by the first public key.

In response to a determination that the feature character string is obtained after decryption of the second identification, the communication between the first device and the second device is established.

For example, the first identification of the first device is at least partly based on the encrypted feature character string and is published through near field communication. For example, the near field communication may include one or more of the following: infrared, Bluetooth, WiFi.

The present disclosure also provides another example method for establishing a communication between devices.

When a second device searches a first identification of a first device, a second private key is used to decrypt the first identification. The first device has or is associated with a first public key and a first private key. The second device has or is associated with a second public key and the second private key. A feature character string is generated for the first device. The second public key of the second device is obtained. The first identification is a published identification in which the feature character string is encrypted by using the second public key.

When the feature character string is obtained after decryption, the first public key of the first device is obtained. The first public key is used to encrypt the feature character string.

The second identification of the second device is at least partly based on the encrypted feature character string and is published. When the first device searches the second identification of the second device, the first device uses the first private key to decrypt the second identification, obtains the feature character string after the decryption, and establishes the communication with the second device.

For example, the encrypted feature character string is used as the second identification of the second device and is published through a near field communication. For example, the near field communication may include one or more of the following: infrared, Bluetooth, WiFi.

The present disclosure provides an example apparatus for establishing a communication between devices. The apparatus may include a feature character string generating module, a second public key obtaining module, a first encrypting module, a first publishing module, a first decrypting module, and a communication establishing module.

The feature character string module generates a feature character string when a first device receives an indication to establish a communication with a second device. The first device has or is associated with a first public key and a first private key. The second device has or is associated with a second public key and a second private key.

The second public key obtaining module obtains the second public key of the second device. The first encrypting module uses the second public key to encrypt the feature character string. The first publishing module publishes a first identification of the first device at least partly based on the encrypted feature character string.

The first decrypting module uses the first private key to decrypt a second identification when the second identification of the second device is searched. The second device searches the first identification and uses the second private key to decrypt the first identification. When the feature character string is obtained after decryption, the first public key of the first device is obtained. The second identification is an identification encrypted by the first public key.

The communication establishing module establishes the communication between the first device and the second device when the feature character string is obtained after decryption.

For example, the first publishing module includes a first near field publishing sub-module. The first near field publishing sub-module uses the encrypted feature character string as the first identification of the first device and publishes the first identification through a near field communication. For example, the near field communication may include one or more of the following: infrared, Bluetooth, and WiFi.

The present disclosure also provides another example apparatus for establishing a communication between devices. The apparatus may include a second decrypting module, a first public key obtaining module, a second encrypting module, and a second publishing module.

The second decrypting module uses a second private key to decrypt a first identification when a second device searches the first identification of a first device. The first device has or is associated with a first public key and a first private key. The second device has or is associated with a second public key and the second private key. A feature character string is generated for the first device. The second public key of the second device is obtained. The first identification is a published identification in which the feature character string is encrypted by using the second public key.

The first public key obtaining module obtains the first public key of the first device when the feature character string is obtained after decryption.

The second encrypting module uses the first public key to encrypt the feature character string. The second publishing module publishes the second identification of the second device at least partly based on the encrypted feature character string. When the first device searches the second identification of the second device, the first device uses the first private key to decrypt the second identification, obtains the feature character string after the decryption, and establishes the communication with the second device.

For example, the second publishing module includes a second near field publishing sub-module. The second near field publishing sub-module publishes the second identification of the second device at least partly based on the encrypted feature character string through a near field communication. For example, the near field communication may include one or more of the following: infrared, Bluetooth, and WiFi.

The present disclosure provides an example system for establishing a communication between devices. The system may include a certificate authority (CA), a first device, and a second device. The first device has or is associated with a first public key and a first private key. The second device has or is associated with a second public key and a second private key.

The CA includes a public key publishing module that publishes the first public key of the first device and/or the second public key of the second device.

The first device includes a feature character string generating module, a second public key obtaining module, a first encrypting module, a first publishing module, a first decrypting module, and a communication establishing module.

The feature character string module generates a feature character string when the first device receives an indication to establish a communication with the second device. The second public key obtaining module obtains the second public key of the second device. The first encrypting module uses the second public key to encrypt the feature character string. The first publishing module publishes a first identification of the first device at least partly based on the encrypted feature character string. The first decrypting module uses the first private key to decrypt a second identification of the second device when the second identification of the second device is searched. The communication establishing module establishes the communication between the first device and the second device when the feature character string is obtained after decryption.

The second device includes a second decrypting module, a first public key obtaining module, a second encrypting module, and a second publishing module.

The second decrypting module uses the second private key to decrypt the first identification when the second device searches the first identification of the first device. The first public key obtaining module obtains the first public key of the first device when the feature character string is obtained after decryption. The second encrypting module uses the first public key to encrypt the feature character string. The second publishing module publishes the second identification of the second device at least partly based on the encrypted feature character string.

For example, the first publishing module includes a first near field publishing sub-module. The first near field publishing sub-module publishes the first identification of the first device at least partly based on the encrypted feature character string through a near field communication.

For example, the second publishing module includes a second near field publishing sub-module. The second near field publishing sub-module publishes the second identification of the second device at least partly based on the encrypted character string. For example, the second near field publishing sub-module uses the encrypted feature character string as the second identification of the second device and publishes the second identification through near field communication. For example, the near field communication may include one or more of the following: infrared, Bluetooth, and WiFi.

Compared with the existing techniques, the present techniques have at least the following advantages. When the first device needs to establish the communication connection, the feature character string is generated, encrypted by using the second public key, and published. The second device uses the second private key for decryption and uses the first public key to encrypt the feature character string and publishes it. The first device uses the first private key for decryption. When the feature character string is obtained, a matching is successful and the communication connection is established between the first device and the second device. The communication and connection established between the devices in the present disclosure may be one to one. A device to be communicated is directly selected, which is a targeted selection and thus accuracy for establishing communication and connection is increased. In addition, public keys and private keys are used twice for authentication, which decreases hacking possibility, increases communication security, and also increases accuracy for establishing communication and connection.

The present techniques may use wireless methods such as infrared, Bluetooth, WiFi to establish communication. Hardware of such wireless methods has been widely used and there is no need to deploy additional communication hardware. Existing communication hardware may be reused, which largely reduces cost. In addition, protocols of such communication methods have been widely used, which increases applicability and adaptability of the present techniques.

DETAILED DESCRIPTION

To illustrate the purposes, characteristics, and advantages of the present techniques, the following descriptions are described by reference to the FIGs and some example embodiments.

Figure 1:
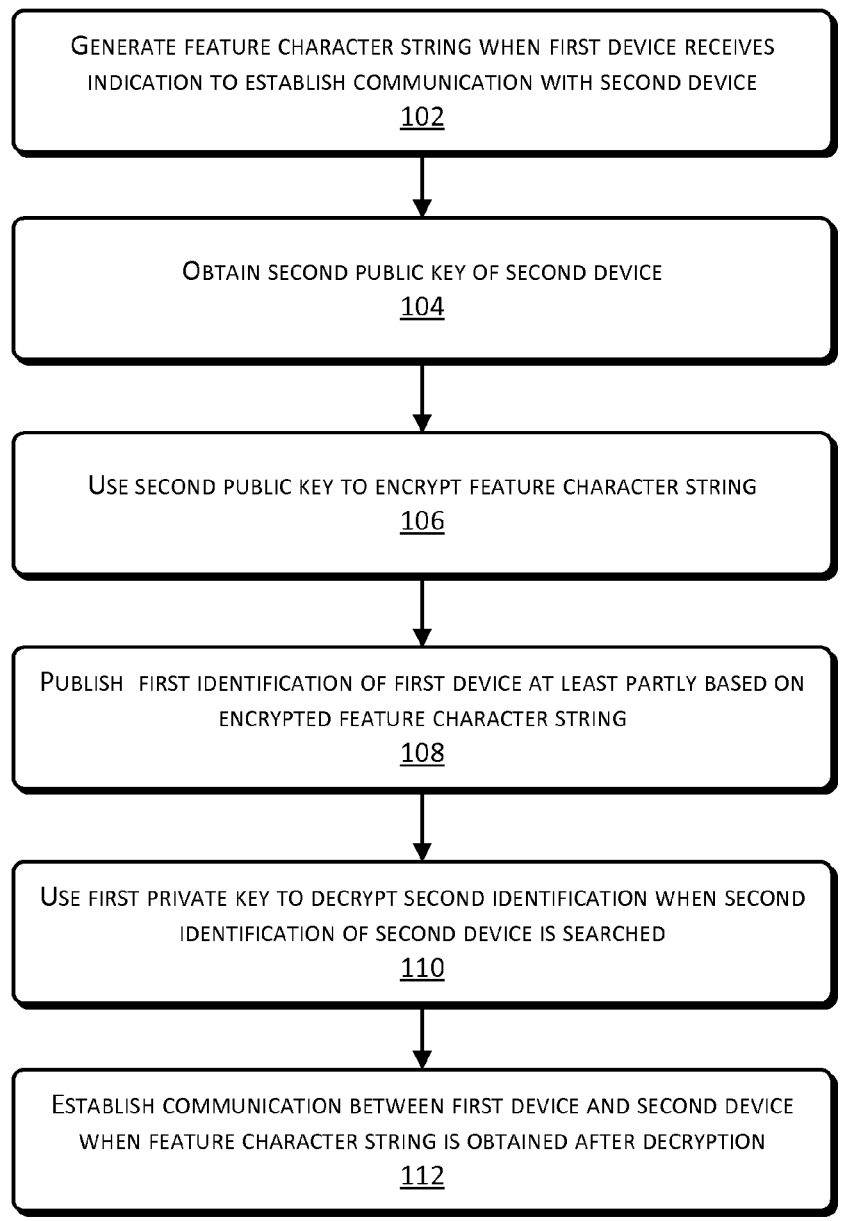
FIG. 1 illustrates a flowchart of an example method for establishing a communication between devices according to a first example method embodiment of the present disclosure.

FIG. 1 illustrates a flowchart of an example method for establishing a communication between devices according to a first example method embodiment of the present disclosure.

At 102, when a first device receives an indication to establish a communication with a second device, a feature character string is generated. The first device has or is associated with a first public key and a first private key. The second device has or is associated with a second public key and a second private key.

For example, the first device or the second device may be a mobile device, such as a tablet, a personal digital assistant, a cell phone, etc. The first device or the second device may be a non-mobile device, such as a ticket issuing machine. The present disclosure does not impose any restriction.

The indication to establish the communication may be an indication that is sent by a user to connect with another device. For example, the user may click an identification of another device (such as name) to request to connect with another device. When the user clicks an indication of the second device, it is equivalent that the indication to establish the communication with the second device is received.

For example, the feature character string generated in the example embodiment may be any feature character string. For instance, the feature character string may be a random character string. An identification of the first device (such as an international mobile equipment identification number (IMEI)) and current time information may be used as the random seed to call a random function such as rand ( ) to generate a random number with a certain length as the feature character string. For instance, the length is between 1 and 128. For another instance, the feature character string may have a fixed length. The present disclosure does not impose any restriction.

At 104, the second public key of the second device is obtained.

For example, a public-key cryptography system may be applicable in this example embodiment. A pair of matching encryption keys is used for encryption and decryption. Each user sets up a private key that is only known to the user (private key) for decryption and signature. In the meantime, a public key is set. The public key is disclosed by the user, shared by a group of users, and used for encryption and authenticate signature. That is, the first public key matches the first private key and the second public key matches the second private key.

It is noted that the public key is public and the private key is confidential. The public key and the private key may be any encryption key. The present disclosure does not impose any restriction.

In this example embodiment, a certificate authority (CA) is deployed to issue the first public key of the first device and/or the second public key of the second device. CA is also referred to as an e-commerce authentication authority, which is an authoritative institution that issues and manages digital certificates or public keys and acts a trusted third party in the e-commerce and is responsible for verifying validity of public keys in the public-key cryptography system.

In this example embodiment, the CA issues a digital certificate to each user that uses the pubic key. The digital certificate proves that the user listed in the digital certificate legally owns the public key listed in the digital certificate.

The CA stored public keys of all users. Through the CA, the second public key of the second device is obtained.

For example, the first device, when receiving the indication to establish the communication with the second device, obtains the second public key of the second device from the CA in real time.

For another example, the first device obtains a list of public keys from the CA in advance. Alternatively, the CA pushes the list of public keys to the first device in advance. The list of public keys lists the public keys issued by the CA, which includes the second public key of the second device. When the indication to establish the communication with the second device is received, the second public key of the second device is searched from the list of public keys.

At 106, the second public key is used to encrypt the feature character string.

For example, any encryption method may be used to apply the second public key to encrypt the feature character string. The present disclosure does not impose any restriction. For example, common public-key cryptography algorithms include RSA algorithm (an asymmetric cryptography named by Ron Rivest, Adi Shamir, and Leonard Adleman), an ElGamal algorithm (a cryptography algorithm), knapsack algorithm, Rabin algorithm, public-key cryptography algorithm in Diffie-Hellman key exchange protocol, and an Elliptic Curve Cryptography algorithm.

At 108, a first identification of the first device is published at least partly based on the encrypted feature character string. For example, the encrypted feature character string is published as a first identification of the first device.

For example, the feature character string generated after encryption is assigned value to the first identification of the first device or label information of the first device, and is then published. Using a name of the first device as an example, assuming the name of the first device is ABC, the encrypted feature character string is 123, the first identification after value assignment is ABC_123, 123, etc. The present disclosure does not impose any restriction as long as the methods for value assignment are uniformly set in advance and the first device and the second device conduct value assignments and decryptions respectively.

For example, operations at 108 may include the following sub-operation. The encrypted feature character string is used as the first identification of the first device and is published through a near field communication. For instance, the near field communication may include one or more of the following: infrared, Bluetooth, WiFi.

For instance, the communication link between the first device and the second device may be an infrared link. Infrared is also referred to as infrared ray, which is a kind of wireless communication and conducted transmission of wireless data. An infrared interface is a standard configuration of new generation mobile phone that supports data transmission between mobile phone and devices and other electronic device. The infrared communication has advantages such as low cost, easy connection, easy use, and compact structure and is thus widely used in small mobile devices. Through infrared interfaces, different types of mobile devices conduct data exchange freely.

For instance, the communication link between the first device and the second device may be a Bluetooth link. Bluetooth is a kind of wireless technology that supports short-distance communication (generally within 10 m) between devices. The Bluetooth technology conducts wireless information exchange between multiple devices including mobile phones, personal digital assistants (PDAs), wireless phones, laptops, and other accessories. The Bluetooth technology adopts decentralized network structure as well as fast frequency hopping and short-packet technology to support point-to-point and point-to-multipoint communication common in the global 2.4 GHz ISM (i.e., industry, scientific, medical) band at the data rate of 1 Mbps. The Bluetooth technology uses time division duplex transmission scheme to achieve full-duplex transmission.

For instance, the communication link between the first device and the second device may be a WiFi link. WiFi (Wireless Fidelity) is a wireless local area network (WLAN) based on IEEE 802.11 standards, which is a widely used short distance wireless transmission technology.

The above transmission methods are just examples. In implementation of the present disclosure, some other transmission methods may be set according to actual situations, such as wireless network protocol ZigBee, wireless Internet transmission other than WiFi, 2.4G wireless network, as long as the first device and the second device set up wireless communication. The present disclosure does not impose any restriction. In addition to the above transmission methods, one of ordinary skill in the art may use other transmission methods based on actual needs. The present disclosure neither imposes any restriction.

The present techniques may use infrared, Bluetooth, WiFi to establish communication connection while hardware for such communication has been widely adopted. No additional communication hardware is required and the existing hardware is directly reusable, which greatly reduces cost of the present techniques. The communication protocols have also been widely used, which increase applicability and adaptability of the present techniques.

At 110, when a second identification of the second device is searched, the first private key is used to decrypt the second identification. The second device searches the first identification and uses the second private key to decrypt the first identification. When the feature character string is obtained after decryption, the first public key of the first device is obtained. The second identification is an identification encrypted by the first public key.

For example, at the second device, a uniform decryption method may be used to decrypt the first identification in advance to obtain a set of characters or the feature character string. The first public key of the first device is used to encrypt the feature character string and the encrypted feature character string is assigned value to the second identification of the second device or label information of the second device for publishing.

The first device uses infrared, Bluetooth, WiFi, or any communication method to search adjacent device, lists a list of device IDs and names, and selects the second device for connection. Then the decryption method corresponding to the first private key is used for decryption.

At 112, when the feature character string is obtained after decryption, the communication between the first device and the second device is established.

For example, the encrypted feature character string is used as the first identification of the first device and is published through near field communication.

The public key is open to the public. Information encrypted by the public key is decrypted by the matching private key to authenticate that data or file published by a party holding the public key is complete and accurate. A receiver thus ascertains that the received information is from the party holding the public key. Such a mechanism is called a digital signature. A form of public key is called digital certificate to prove that the information is published by the party holding the public key and not forged or changed by a third party.

When the string obtained after decryption is the feature character string, the first device and the second device successfully match and establish the communication connection. When the string obtained after decryption is not the feature character string, the first device and the second device do not match and the communication connection is cancelled.

The present techniques generate the feature character string and use the second public key to encrypt it and then publish it when the first device needs to establish communication connection. The second device uses the second private key for decryption and then uses the first public key to encrypt the feature character string and then publishes it. The first device uses the first private key for decryption. If the feature character string is obtained, the first device and the second device successfully match and the communication connection between the first device and the second device is established. In the example embodiment, the communication connection established between devices may be one to one. That is, the device for communication is directly selected, which is a targeted selection. Thus, the present techniques improve accuracy for establishing communication connection. In addition, double public keys and private keys are used for authentication, which reduces a chance of hacking and decryption and improves communication security and the accuracy for establishing communication connection.

Figure 2:
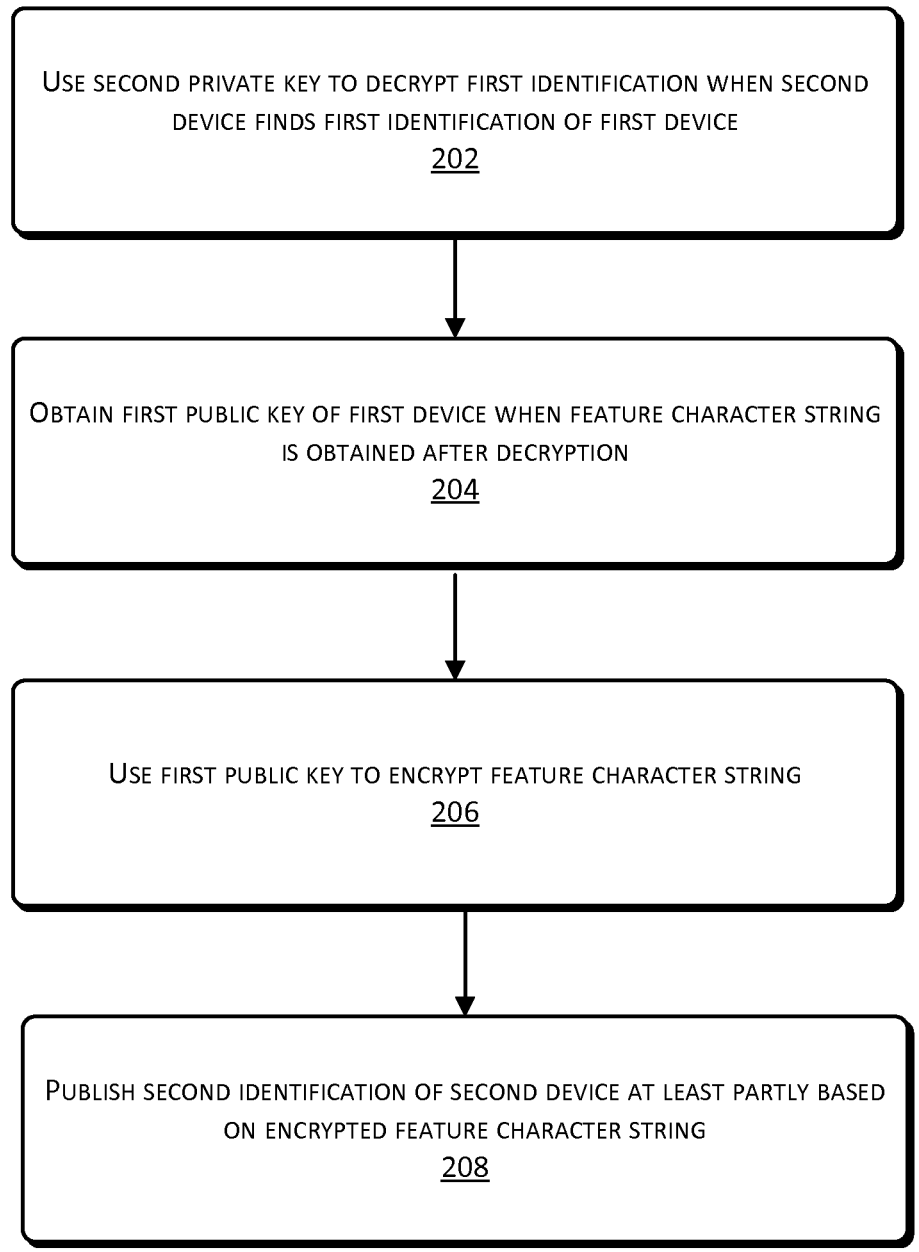
FIG. 2 illustrates a flowchart of another example method for establishing a communication between devices according to a second example method embodiment of the present disclosure.

FIG. 2 illustrates a flowchart of another example method for establishing a communication between devices according to a second example method embodiment of the present disclosure.

At 202, when a second device finds a first identification of a first device, a second private key is used to decrypt the first identification of the first device. The first device has or is associated with a first public key and a first private key. The second device has or is associated with a second public key and the second private key. A first identification includes a feature character string generated at the first device. The second public key of the second device is obtained. The first identification is a published identification in which the feature character string is encrypted by using the second public key.

For example, the first device may use operations from 102 to 108 to generate and publish the first identification.

For example, the second device may use infrared, Bluetooth, WiFi or another communication method to search adjacent device, list a list of device IDs and names, and select the first device for connection. Then the decryption method corresponding to the second private key is used for decryption.

At 204, when the feature character string is obtained after decryption, the first public key of the first device is obtained.

A feature character string is obtained after successful decryption, which is the feature character string. For example, a CA may be deployed to issue the first public key of the first device and/or the second public key of the second device.

For example, CA issues a digital certificate to each user that uses the public key. The digital certificate is to prove that a user listed in the digital certificate legally owns the public key listed in the digital certificate.

The CA stores public keys used by all users. The first public key of the first device is obtained from the CA.

For example, the second device, when receiving the indication to establish the communication with the first device, obtains the first public key of the first device from the CA in real time.

For another example, the second device obtains a list of public keys from the CA in advance. Alternatively, the CA pushes the list of public keys to the second device in advance. The list of public keys lists the public keys issued by the CA, which includes the first public key of the first device. After the feature character string is obtained after decryption, the first public key of the first device is searched from the list of public keys.

At 206, the first public key is used to encrypt the feature character string.

For example, any encryption method may be used to apply the first public key to encrypt the feature character string. The present disclosure does not impose any restriction. For example, common public-key cryptography algorithms include RSA algorithm (an asymmetric cryptography named by Ron Rivest, Adi Shamir, and Leonard Adleman), an ElGamal algorithm (an cryptography algorithm), knapsack algorithm, Rabin algorithm, public-key cryptography algorithm in Diffie-Hellman key exchange protocol, and an Elliptic Curve Cryptography algorithm.

At 208, a second identification of the second device is published at least partly based on the encrypted feature character string. For example, the encrypted feature character string is published as a second identification of the second device.

The first device searches the second identification of the second device, uses the first private key to encrypt the second identification, and establishes the communication connection between the first device and the second device when the feature character string is obtained after decryption.

For example, the feature character string generated after encryption is assigned value to the second identification of the second device or label information of the second device, and is then published.

For example, operations at 208 may include the following sub-operation. The encrypted feature character string is used as the second identification of the second device and is published through near field communication. For instance, the near field communication may include one or more of the following: infrared, Bluetooth, WiFi.

The above transmission methods are just exemplary. In implementation of the present disclosure, some other transaction methods may be set according to actual situations. The present disclosure does not impose any restriction. In addition to the above transmission methods, one of ordinary skill in the art may use other transmission methods based on actual needs. The present disclosure neither imposes any restriction.

In this example embodiment, the first device establishes communication connection with the second device through operations at 110 and 112.

It is noted that, for the purpose of brevity, the example method embodiments are described as a series of combinations of operations. However, one of ordinary skill in the art may be aware that the present techniques are not restricted by the described sequences. According to the present disclosure, some operations may happen according to other sequences or concurrently. In addition, one of ordinary skill in the art may understand that the embodiments described herein are just example embodiments. The described operations may not be necessary for each embodiments of the present disclosure.

Figure 3:
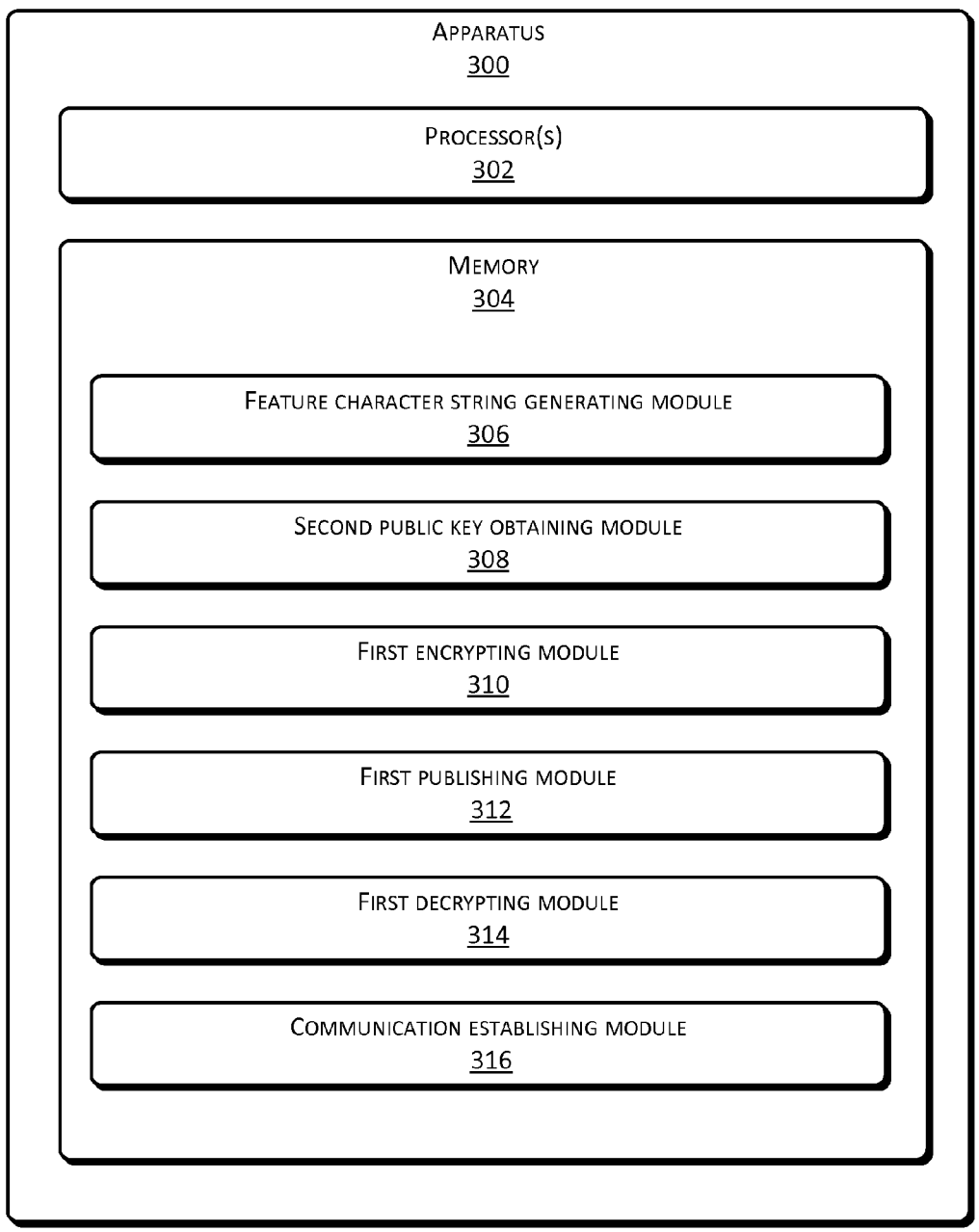
FIG. 3 illustrates a diagram of an example apparatus for establishing a communication between devices according to a first example apparatus embodiment of the present disclosure.

FIG. 3 illustrates a diagram of an example apparatus 300 for establishing a communication between devices according to a first example apparatus embodiment of the present disclosure.

The apparatus 300 may include one or more processor(s) or data processing unit(s) 302 and memory 304. The memory 304 is an example of computer-readable media. The memory 304 may store therein a plurality of modules or units including a feature character string generating module 306, a second public key obtaining module 308, a first encrypting module 310, a first publishing module 312, a first decrypting module 314, and a communication establishing module 316.

The feature character string module 306 generates a feature character string when a first device receives an indication to establish a communication with a second device. The first device has or is associated with a first public key and a first private key. The second device has or is associated with a second public key and a second private key.

The second public key obtaining module 308 obtains the second public key of the second device. The first encrypting module 310 uses the second public key to encrypt the feature character string. The first publishing module 312 publishes a first identification of the first device at least partly based on the encrypted character string. For example, the first publishing module 312 publishes the encrypted feature character string as a first identification of the first device.

The first decrypting module 314 uses the first private key to decrypt a second identification when the second identification of the second device is searched. The second device searches the first identification and uses the second private key to decrypt the first identification. When the feature character string is obtained after decryption, the first public key of the first device is obtained. The second identification is an identification encrypted by the first public key.

The communication establishing module 316 establishes the communication between the first device and the second device when the feature character string is obtained after decryption.

For example, the first publishing module 312 may include a first near field publishing sub-module (not shown in FIG. 3). The first near field publishing sub-module uses the encrypted feature character string as the first identification of the first device and publishes the first identification through near field communication. For example, the near field communication may include one or more of the following: infrared, Bluetooth, and WiFi.

Figure 4:
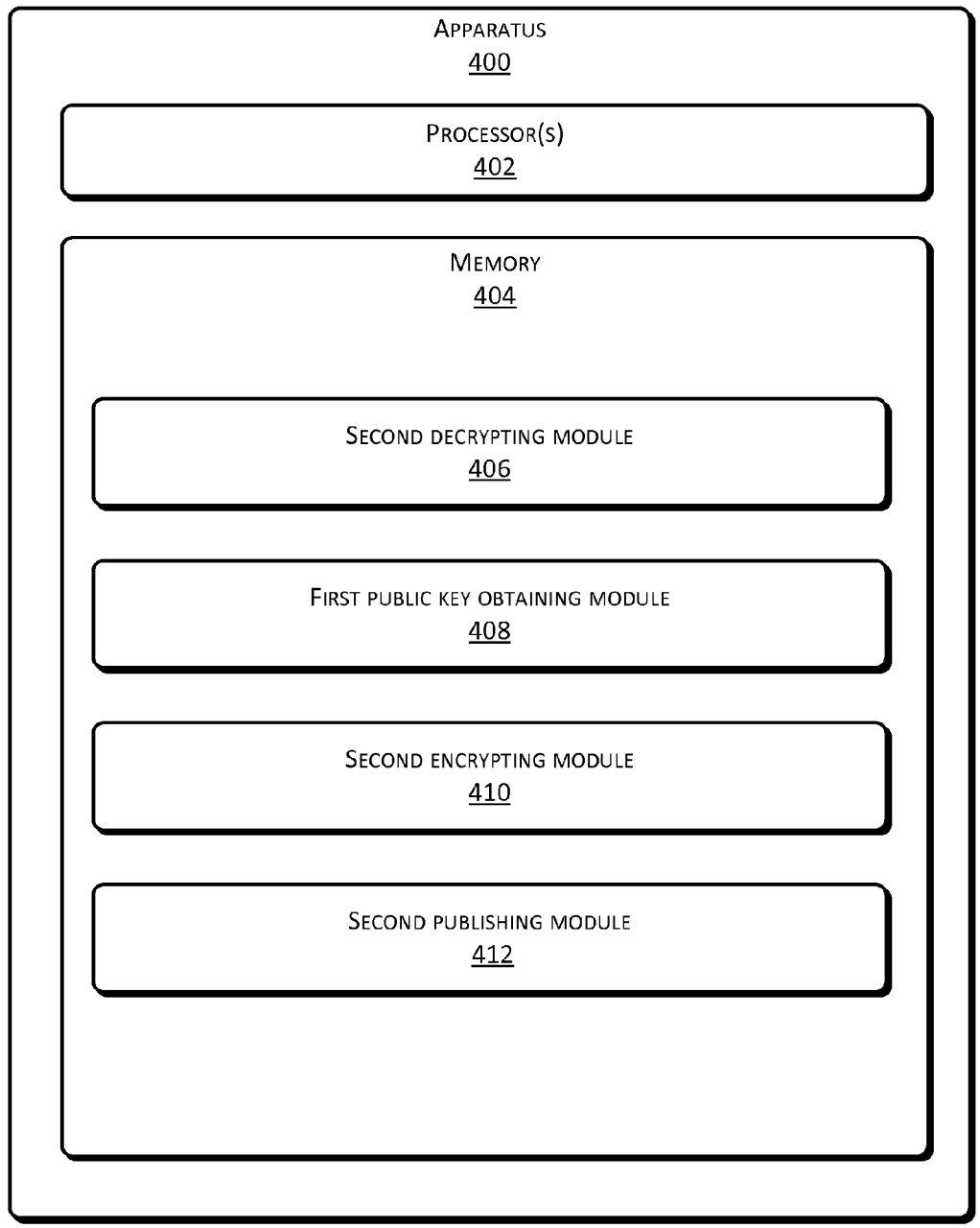
FIG. 4 illustrates a diagram of another example apparatus for establishing a communication between devices according to a second example apparatus embodiment of the present disclosure.

FIG. 4 illustrates a diagram of another example apparatus 400 for establishing a communication between devices according to a second example apparatus embodiment of the present disclosure.

The apparatus 400 may include one or more processor(s) or data processing unit(s) 402 and memory 404. The memory 404 is an example of computer-readable media. The memory 404 may store therein a plurality of modules or units including a second decrypting module 406, a first public key obtaining module 408, a second encrypting module 410, and a second publishing module 412.

The second decrypting module 406 uses a second private key to decrypt a first identification when a second device searches the first identification of a first device. The first device has or is associated with a first public key and a first private key. The second device has or is associated with a second public key and the second private key. A feature character string is generated for the first device. The second public key of the second device is obtained. The first identification is a published identification in which the feature character string is encrypted by using the second public key.

The first public key obtaining module 408 obtains the first public key of the first device when the feature character string is obtained after decryption.

The second encrypting module 410 uses the first public key to encrypt the feature character string. The second publishing module 412 publishes the second identification of the second device at least partly based on the encrypted character string. For example, the second publishing module 412 publishes the encrypted feature character string as the second identification of the second device. When the first device searches the second identification of the second device, the first device uses the first private key to decrypt the second identification, obtains the feature character string after the decryption, and establishes the communication with the second device.

For example, the second publishing module 412 may include a second near field publishing sub-module (not shown in FIG. 4). The second near field publishing sub-module uses the encrypted feature character string as the second identification of the second device and publishes the second identification through near field communication. For example, the near field communication may include one or more of the following: infrared, Bluetooth, and WiFi.

Figure 5:
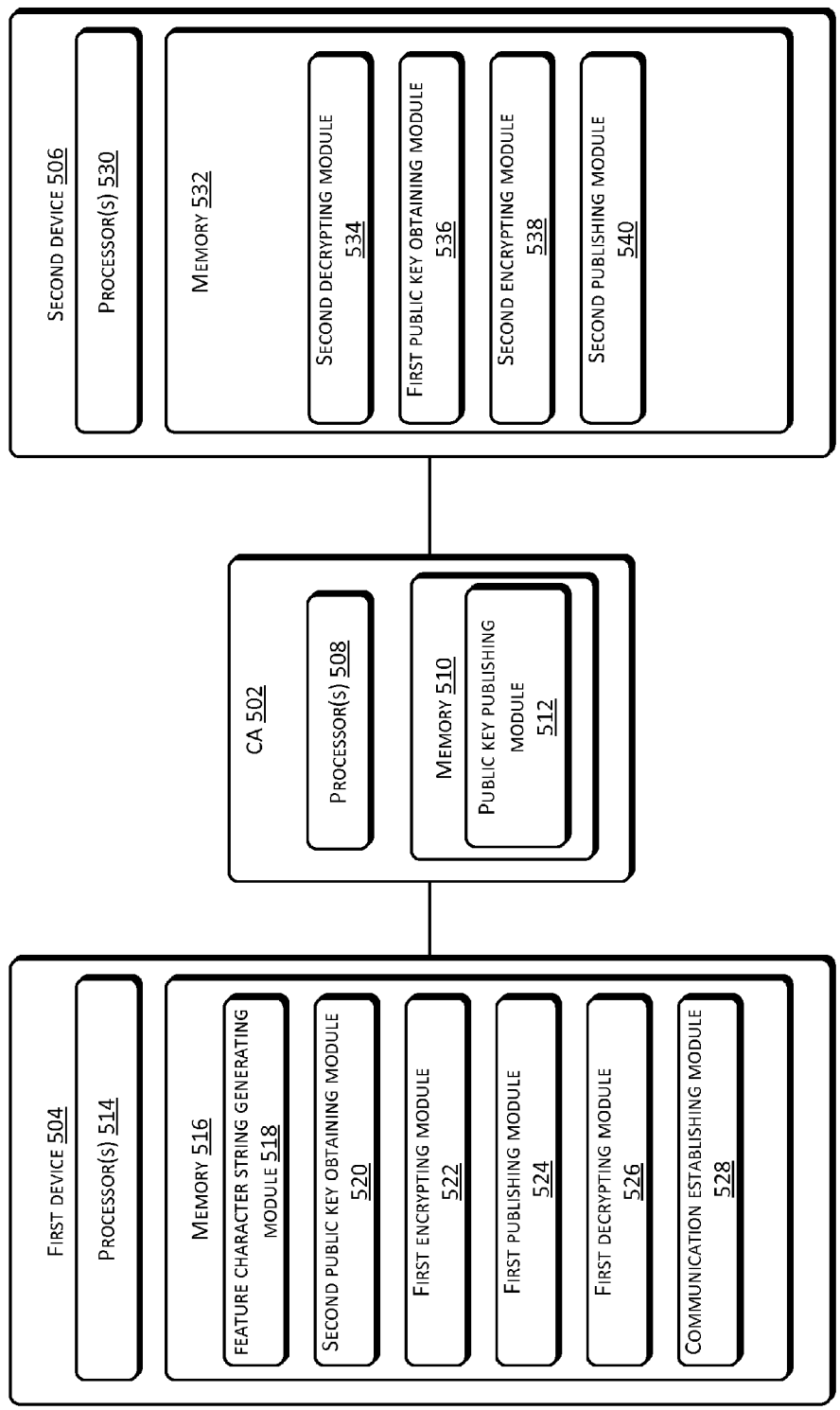
FIG. 5 illustrates a diagram of an example system for establishing a communication between devices according to the present disclosure.

FIG. 5 illustrates a diagram of an example system 500 for establishing a communication between devices according to the present disclosure. The system 500 may include a certificate authority (CA) 502, a first device 504, and a second device 506. The first device 504 has or is associated with a first public key and a first private key. The second device 506 has or is associated with a second public key and a second private key.

The CA 502 may include one or more processor(s) or data processing unit(s) 508 and memory 510. The memory 510 is an example of computer-readable media. The memory 510 may store therein a plurality of modules or units including a public key publishing module 512 that publishes the first public key of the first device and/or the second public key of the second device.

The first device 504 may include one or more processor(s) or data processing unit(s) 514 and memory 516. The memory 516 is an example of computer-readable media. The memory 516 may store therein a plurality of modules or units including a feature character string generating module 518, a second public key obtaining module 520, a first encrypting module 522, a first publishing module 524, a first decrypting module 526, and a communication establishing module 528.

The feature character string module 518 generates a feature character string when the first device receives an indication to establish a communication with the second device. The second public key obtaining module 520 obtains the second public key of the second device. The first encrypting module 522 uses the second public key to encrypt the feature character string. The first publishing module 524 publishes a first identification of the first device at least partly based on the encrypted feature character string. For example, the first publishing module 524 publishes the encrypted feature character string as a first identification of the first device. The first decrypting module 526 uses the first private key to decrypt a second identification when the second identification of the second device is searched. The communication establishing module 528 establishes the communication between the first device and the second device when the feature character string is obtained after decryption.

The second device 506 may include one or more processor(s) or data processing unit(s) 530 and memory 532. The memory 532 is an example of computer-readable media. The memory 532 may store therein a plurality of modules or units including a second decrypting module 534, a first public key obtaining module 536, a second encrypting module 538, and a second publishing module 540.

The second decrypting module 534 uses the second private key to decrypt the first identification when the second device searches the first identification of the first device. The first public key obtaining module 536 obtains the first public key of the first device when the feature character string is obtained after decryption. The second encrypting module 538 uses the first public key to encrypt the feature character string. The second publishing module 540 publishes a second identification of the second device at least partly based on the encrypted feature character string. For example, the second publishing module 540 publishes the encrypted feature character string as the second identification of the second device.

For example, the first publishing module 524 includes a first near field publishing sub-module (not shown in FIG. 5). The first near field publishing sub-module uses the encrypted feature character string as the first identification of the first device and publishes the first identification through near field communication.

For example, the second publishing module 540 includes a second near field publishing sub-module (not shown in FIG. 5). The second near field publishing sub-module uses the encrypted feature character string as the second identification of the second device and publishes the second identification through near field communication. For example, the near field communication may include one or more of the following: infrared, Bluetooth, and WiFi.

The apparatus and system example embodiments are similar to the example method embodiments and are thus described briefly. Relevant portions of the apparatus and example embodiments may refer to relevant portions of the example method embodiments.

The example embodiments of the present disclosure are described progressively. Each example embodiment emphasizes differences from another example embodiment. Same and similar portions of the example embodiments may refer to each other.

One of ordinary skill in the art should understand that the embodiments of the present disclosure may be methods, systems, or the programming products of computers. Therefore, the present disclosure may be implemented by hardware, software, or in combination of both. In addition, the present techniques may be presented in a form of one or more computer programs containing the computer-executable instructions which may be implemented in the computer-readable medium (including but not limited to disks, CD-ROM, optical disks, etc.).

In a standard configuration, a computing device or system as described in the present disclosure may include one or more central processing units (CPU), one or more input/output interfaces, one or more network interfaces, and memory.

The memory may include forms such as non-permanent memory, random access memory (RAM), and/or non-volatile memory such as read only memory (ROM) and flash random access memory (flash RAM) in the computer-readable media. The memory is an example of computer-readable media.

The computer-readable media includes permanent and non-permanent, movable and non-movable media that may use any methods or techniques to implement information storage. The information may be computer-readable instructions, data structure, software modules, or any data. The example of computer-readable media or computer storage media may include, but is not limited to, phase-change memory (PCM), static random access memory (SRAM), dynamic random access memory (DRAM), other type RAM, ROM, electrically erasable programmable read only memory (EEPROM), flash memory, internal memory, CD-ROM, DVD, optical memory, magnetic tape, magnetic disk, any other magnetic storage device, or any other non-communication media that may store information accessible by the computing device. As defined herein, the computer-readable media does not include transitory media such as a modulated data signal and a carrier wave.

The example embodiments are described by referring to the flow charts and/or block diagrams of the method, device (system) and computer program of the embodiments of the present disclosure. It should be understood that each flow and/or block and the combination of the flow and/or block of the flowchart and/or block diagram may be implemented by computer program instructions. These computer program instructions may be provided to the general computers, specific computers, embedded processor or other programmable data processors to generate a machine, so that a device of implementing one or more flows of the flow chart and/or one or more blocks of the block diagram may be generated through the instructions operated by a computer or other programmable data processors.

These computer program instructions may also be stored in other computer-readable storage which may instruct a computer or other programmable data processors to operate in a certain way, so that the instructions stored in the computer-readable storage generate a product containing the instruction device, wherein the instruction device implements the functions specified in one or more flows of the flow chart and/or one or more blocks of the block diagram.

These computer program instructions may also be loaded in a computer or other programmable data processors, so that the computer or other programmable data processors can operate a series of operation steps to generate the process implemented by a computer. Accordingly, the instructions operated in the computer or other programmable data processors can provides the steps for implementing the functions specified in one or more flows of the flow chart and/or one or more blocks of the block diagram.

The present disclosure describes some example embodiments. One of ordinary skill in the art, once obtain the basic inventive concepts, may conduct certain modifications and improvements. Thus, the claims shall be constructed to cover not only the example embodiments of the present disclosure but also any modification and change under the protection of the present disclosure.

It should be noted that the relationship terms such as "a first," "a second," etc. are only used to differentiate one entity or operation from another entity or operation and do not necessarily imply that there is such actual relationship or sequence between the entities or operations. In addition, the terms "including," "comprising," or any variation thereof refers to non-exclusive inclusion so that a process, method, product, or device that includes a plurality of elements does not only include the plurality of elements but also any other element that is not expressly listed, or any element that is essential or inherent for such process, method, product, or device. Without more restriction, the elements defined by the phrase "including a . . . " does not exclude that the process, method, product, or device includes another same element in addition to the element.

The present disclosure provides example methods, apparatuses, and system for establishing a communication between devices. The example embodiments of the present disclosure illustrate the principles and implementations of the present disclosure. The examples embodiments help understand the methods and core concepts of the present disclosure. One of ordinary skill in the art may conduct any changes in the detailed implementations and applications according to the principles of the present disclosure. The present descriptions shall not be construed as restrictions to the present disclosure.

What is claimed is:

1. A method comprising:
   generating a feature character string when a first device receives a request to establish a communication from a second device including an indication of a second public key, wherein the first device is associated with a first public key and a first private key, and the second device is associated with the second public key and a second private key;
   using the second public key to encrypt the feature character string;
   publishing a first identification of the first device that is at least partly based on the encrypted feature character string;
   using the first private key to decrypt a second identification of the second device, wherein the second identification is configured and transmitted by the second device to include the feature character string generated by the first device and encrypted using the first public key of the first device;
   determining that the feature character string is obtained after using the first private key to decrypt the second identification of the second device; and
   establishing the communication between the first device and the second device.

2. The method as recited in claim 1, wherein the publishing the first identification of the first device comprises publishing the first identification of the first device through a near field communication.

3. The method as recited in claim 2, wherein the near field communication comprises one or more of:
   Infrared;
   Bluetooth; and
   WiFi.

4. The method as recited in claim 1, wherein the publishing the first identification of the first device comprises assigning a value of the feature character string to be included in the first identification of the first device.

5. The method as recited in claim 1, wherein the first device or the second device is a mobile device.

6. The method as recited in claim 1, wherein the indication is a click by a user to a representation of the second device through the first device.

7. The method as recited in claim 1, wherein the feature character string is a random character string.

8. The method as recited in claim 1, wherein the generating the feature character string comprises using an international mobile equipment identification number (IMEI) and time information as a random seed to call a random function to generate the random number as the feature character string.

9. The method as recited in claim 1, wherein the obtaining the second public key of the second device comprises searching the second public key from a Certificate Authority after the first device receives the indication to establish the communication with the second device.

10. The method as recited in claim 1, further comprising:
    receiving at the first device a list of public keys from a Certificate Authority; and
    searching for the second public key from the list of public keys after the first device receives the indication to establish the communication with the second device.

11. A method comprising:
    receiving a first identification transmitted by a first device, the first identification configured to include an indication of a first public key of the first device and an encrypted feature character string which is generated and encrypted by the first device upon receiving a request to establish a communication from a second device, the request to establish the communication including an indication of a second public key, wherein the first device is associated with the first public key and a first private key, and the second device is associated with the second public key and a second private key;
    obtaining, by the second device, the first public key of the first device and the feature character string after using the second private key associated with the second device to decrypt the first identification of the first device;
    using the first public key to encrypt the feature character string by the second device; and
    publishing a second identification of the second device at least partly based on the encrypted feature character string encrypted using the first public key, the published second identification being configured to be decrypted by the first device using the first private key to obtain the feature character string to establish the communication between the first device and the second device.

12. The method as recited in claim 11, wherein the publishing the second identification of the second device comprises publishing the second identification of the second device through a near field communication.

13. The method as recited in claim 12, wherein the near field communication comprises one or more of:
    Infrared;
    Bluetooth; and
    WiFi.

14. The method as recited in claim 11, wherein the obtaining the first public key of the first device comprises receiving the first public key from a Certificate Authority.

15. A system comprising:
a first device including:
memory;
one or more processors operably coupled to the memory; and
one or more modules stored in the memory and executable by the one or more processors, the one or more modules including:
a feature character string module configured to generate a feature character string when the first device receives a request to establish a communication from a second device including an indication of a second public key;
a second public key obtaining module configured to obtain the second public key of the second device, wherein the first device is associated with a first public key and a first private key, and the second device is associated with the second public key and the second private key;
a first encrypting module configured to use the second public key to encrypt the feature character string;
a first publishing module configured to publish a first identification of the first device at least partly based on the encrypted feature character string;
a first decrypting module configured to use the first private key to decrypt a second identification of the second device, wherein the second identification being configured and transmitted by the second, device to include the feature character string generated by the first device and encrypted using the first public key; and
a communication establishing module configured to establish the communication between the first device and the second device in response to determining that the feature character string is obtained after the first decrypting module uses the first private key to decrypt the second identification of the second device.

16. The system as recited in claim 15, further comprising a certificate authority including a public key publishing module that publishes the first public key of the first device or the second public key of the second device.

17. The system as recited in claim 15, wherein the second device includes:
a second decrypting module configured to use the second private key to decrypt the first identification when the second device searches the first identification of the first device;
a first public key obtaining module configured to obtain the first public key of the first device when the feature character string is obtained after decryption;
a second encrypting module configured to use the first public key to encrypt the feature character string; and
a second publishing module configured to publish the second identification of the second device at least partly based on the encrypted feature character string.

18. The system as recited in claim 15, wherein the communication comprises a near field communication.

19. The system as recited in claim 18, wherein the near field communication comprises one or more of:
Infrared;
Bluetooth; and
WiFi.

20. The system as recited in claim 15, wherein the feature character string is a random character string.

\* \* \* \* \*